United States Patent
Miller et al.

[11] Patent Number: 6,138,589
[45] Date of Patent: Oct. 31, 2000

[54] BULB PLANTING DEVICE

[75] Inventors: Michael T. Miller, Edina; Dana C. Post, Minnetonka, both of Minn.

[73] Assignee: Hound Dog Products, Inc., Edina, Minn.

[21] Appl. No.: 09/372,429

[22] Filed: Aug. 11, 1999

Related U.S. Application Data

[60] Provisional application No. 60/096,424, Aug. 13, 1998.
[51] Int. Cl.⁷ .............................. A01C 5/02; A01C 11/02
[52] U.S. Cl. .............................................. 111/106; 111/95
[58] Field of Search ........................... 111/100–102, 106, 111/115, 114, 89, 92, 95–99, 7.1

[56] References Cited

U.S. PATENT DOCUMENTS

| | | | |
|---|---|---|---|
| 334,029 | 1/1886 | Mitchum | 111/106 |
| 594,305 | 11/1897 | Wight | 111/106 |
| 3,150,620 | 9/1964 | Popplewell | 111/106 |
| 3,749,034 | 7/1973 | Bergius et al. | 111/106 |
| 4,706,582 | 11/1987 | Keskilohko | 111/106 |
| 5,156,101 | 10/1992 | Wien | 111/101 |
| 5,265,546 | 11/1993 | Sheeter | 111/101 |

FOREIGN PATENT DOCUMENTS

| | | | |
|---|---|---|---|
| 178756 | 6/1954 | Austria | 111/106 |
| 802282 | 9/1936 | France | 111/106 |
| 1253447 | 8/1986 | U.S.S.R. | 111/106 |

*Primary Examiner*—Christopher J. Novosad
*Attorney, Agent, or Firm*—Nikolai, Mersereau & Dietz, P.A.

[57] ABSTRACT

A gardening tool used for bulb planting having a frustoconically shaped earth removing portion with the approximate size and depth needed to remove enough soil to plant a bulb. The tool has a handle for holding onto the device and placing it on the ground for use without having to bend over. The tool also has a foot bar for ease of forcing the earth removing portion into the ground by standing on the foot bar. When the earth is removed and the bulb is placed in the ground, an actuating rod on the gardening tool is pulled to open the frustroconically shaped earth removing portion to deposit the soil therein on the bulb to complete the planting process.

8 Claims, 1 Drawing Sheet

BULB PLANTING DEVICE

This appln claims the benefit of U.S. Provisional Ser. No. 60/096,424 filed Aug. 13, 1998.

BACKGROUND OF THE INVENTION

I. Field of the Invention

This invention relates generally to garden tools, and more particularly to a device that can conveniently be used for planting flower bulbs at appropriate depths in the ground. More particularly, the tool of the present invention can be used to remove a core of earth from the ground into which a flower bulb or bulbs may be deposited before the core or plug is reinserted atop the bulbs.

II. Discussion of the Prior Art

We are aware of hand tools specifically designed to facilitate planting of tuber propagating plants. For the most part, they are used by a person who is required to kneel on the ground and force a frustoconical-shaped sleeve into the earth using arm power along with a reciprocating twisting motion allowing the lower end of the tool to dig into the earth.

The present invention provides an improvement over known, prior art bulb planting tools.

SUMMARY OF THE INVENTION

In accordance with the present invention, there is provided a bulb planting tool having an elongated handle allowing its use by a person while standing. The handle is preferably made of metal tubing and secured to the upper end thereof is a transversely extending cylindrical handle. Formed through the wall of the tubular handle proximate the transversely extending gripping bar is an actuator handle that can be raised and lowered relative to the gripping bar. The actuator handle connects to a cable that extends downward through the tubular handle and exits through an aperture formed in the lower end of the handle. The cable is secured to one-half of a frustoconical-shaped coring device that is pivotally secured to a second half of the coring device, the second half of the coring device being welded or otherwise affixed to the lower end of the handle. Completing the device is a transversely extending bar disposed near the lower end of the handle to which leg pressure can be applied.

In digging an opening for a bulb, the lower end of the coring device is placed against the soil at the location where the planting is to take place. The operator, while holding the hand grip, may step downward on the lower transverse foot bar so as to force the frustoconically shaped two-piece hinged coring device into the ground. By then lifting the tool out of the ground, a core remains contained within the coring device, allowing a bulb to be dropped into the hole. Now, by squeezing the actuator rod and lifting it in its slot in the handle, the cable is tensioned to swing the movable portion of the coring device away from the fixed portion, allowing release of the dirt core.

DESCRIPTION OF A PREFERRED EMBODIMENT

Figure 1:
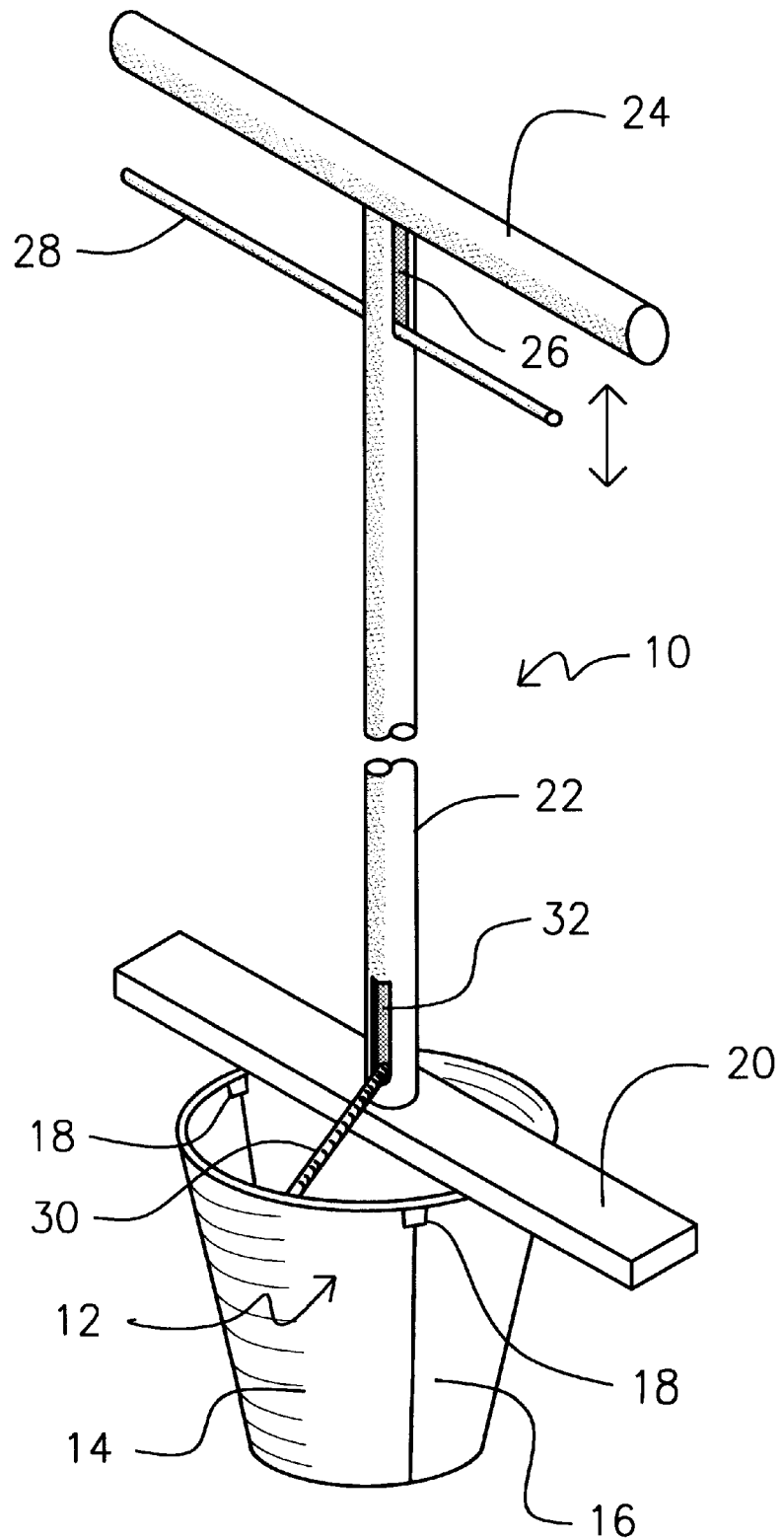
FIG. 1 is a perspective view of the bulb planting tool of the present invention.

Referring to FIG. 1, there is indicated generally by numeral 10 a bulb-planting tool in accordance with the present invention. It is seen to comprise a steel frustoconically shaped earth coring device 12 comprising first and second halves 14 and 16 that are hinged together by a rivet or pin 18 passing through both halves 14 and 16 proximate the upper perimeter thereof The half 16 of the coring device 12 is fixedly attached to a foot bar 20 and, thus, is stationary relative to the remaining portion of the tool. Welded to the upper surface of the foot bar 20 is a transversely extending, elongated tubular handle 22 of a predetermined length. Affixed to the upper end of the handle 22 is a transversely extending hand grip 24. Passing through a longitudinally extending slot 26 formed through the side walls of the tube 22 is an actuating rod 28. A cable 30 attaches at its upper end to this actuating rod 28 and extends through the lumen of the tubular handle 22, exiting a slot 32 formed through the side wall of the tube 22 proximate its lower end. The lower end of the cable 30 is affixed to the movable segment 14 of the coring device 12 so that squeezing the actuator handle 28 against the handle grip 24 tensions the cable 30, causing the segment 14 of the coring device to spread relative to the stationary segment 16, thus allowing the earth core dug from the ground to be released from the coring tube.

The operation of the device can now readily be appreciated. When it is desired to plant one or more bulbs in a hole dug in the earth, the tool is positioned with the coring tube 12 at the desired location. While holding on to the hand grip 24 for balance, the user may step upon the transversely extending foot bar 20 to apply body weight to the device and forcing the coring tube 12 into the ground. Next, by again standing on the ground and lifting the handle 24, the earth core will be lifted free of the hole while remaining contained within the coring tube. The bulbs may now be placed into the hole in the earth just formed. Now, by holding the tool over the hole and lifting on the actuating rod 28, the movable half 14 of the core tube 12 will swing out, allowing the earth core to drop back into the hole, completing the planting operation.

What is claimed is:

1. A bulb planting device comprising:
    an earth coring device for removing soil from the ground,
    the earth coring device having a fixed portion and a moving portion, pivotably connected to the fixed portion, for opening and closing the earth coring device and releasing soil from the coring device when opened,
    a foot bar attached to the fixed portion of the earth coring device, for applying pressure on the earth coring device to force the earth coring device into the soil,
    a handle attached to the foot bar and extending upward therefrom,
    a hand grip attached to upper end of the handle, for holding the bulb planting device,
    an actuating rod movably attached to the handle,
    a cable connected to the actuating rod and connected to the moving portion of the earth coring device, such that when the actuating rod is moved, the cable activates the movable portion of the earth coring device to pivot relative to the fixed portion of the earth coring device
    the handle has a lumen and an aperture for admitting the actuating rod such that the actuating rod slides up and down in the handle parallel to and proximate the hand grip.
2. A bulb planting device as in claim 1 wherein,
    the cable attaches to the actuating rod inside the handle and travels the length of the handle inside of the handle.
3. A bulb planting device as in claim 2 wherein, an aperture at the base of the handle allows the cable to exit the lumen of the handle so that it can be connected to the movable portion of the earth coring device.

4. A bulb planting device as in claim 3 wherein, the earth coring device has a frustoconical shape with the small diameter portion pointing downward.

5. A bulb planting device as in claim 1 wherein, the earth coring device has a frustoconical shape with the small diameter portion pointing downward.

6. A bulb planting device comprising:

an earth coring device having a frustoconical shape for removing soil from the ground, the earth coring device having a fixed portion and a moving portion, pivotably connected to the fixed portion, for opening and closing the earth coring device to release soil from the coring device when opened, a foot bar attached to the top of the fixed portion of the earth coring device, for applying pressure on the earth coring device to force the earth coring device into the soil, a handle having a lumen attached to the foot bar and extending upward therefrom, a hand grip attached to upper end of the handle, for holding the bulb planting device, an actuating rod extending through an elongated slot aperture in the handle proximate the hand grip, for ease of pulling the actuating rod toward the hand grip, a cable connected to the actuating rod inside the handle lumen and connected to the moving portion of the earth coring device, such that when the actuating rod is pulled toward the hand grip, the cable activates the movable portion of the earth coring device to pivot relative to the fixed portion of the earth coring device for releasing the soil contained therein.

7. A bulb planting device as in claim 6 wherein, an aperture at the base of the handle allows the cable to exit the lumen of the handle so that it can be connected to the movable portion of the earth coring device.

8. A bulb planting device as in claim 7 wherein, the hand grip is perpendicular to and centered on the top of the handle.

* * * * *